United States Patent
Zhou et al.

(10) Patent No.: US 8,732,009 B1
(45) Date of Patent: May 20, 2014

(54) DYNAMICALLY CHANGING PHONE NUMBERS BASED ON USER BROWSING BEHAVIOR

(75) Inventors: Jian Zhou, Milpitas, CA (US); Anshul Kothari, Sunnyvale, CA (US); Surojit Chatterjee, Fremont, CA (US)

(73) Assignee: Google Inc., Mountain View, CA (US)

( * ) Notice: Subject to any disclaimer, the term of this patent is extended or adjusted under 35 U.S.C. 154(b) by 291 days.

(21) Appl. No.: 13/216,695

(22) Filed: Aug. 24, 2011

(51) Int. Cl.
*G06Q 30/00* (2012.01)
*G06Q 90/00* (2006.01)

(52) U.S. Cl.
CPC .................................. *G06Q 90/00* (2013.01)
USPC ........................................................ 705/14.1

(58) Field of Classification Search
USPC ....................................................... 705/14.1
See application file for complete search history.

(56) References Cited

U.S. PATENT DOCUMENTS 8,249,920 B2 *  8/2012  Smith ........................... 705/14.1

* cited by examiner

*Primary Examiner* — Daniel Lastra
(74) *Attorney, Agent, or Firm* — Fish & Richardson P.C.

(57) ABSTRACT

Various methods, systems, and computer program products are disclosed for determining phone numbers based on user interests. The method may include receiving an indication of one or more user actions. The method may include determining an interest of the user based on the one or more user actions. The method may include determining a product or service in which the user may be interested based on the determined interest of the user. The method may include selecting a first phone number of a vendor of the product or service and a second phone number of a call center. The method may include providing the second phone number to be communicated, wherein the second phone number when called connects a call to the first phone number.

20 Claims, 4 Drawing Sheets

DYNAMICALLY CHANGING PHONE NUMBERS BASED ON USER BROWSING BEHAVIOR

FIELD OF THE INVENTION

The disclosure relates to communicating promotional messages to computing device(s) and in particular to determining phone numbers based on user interests.

BACKGROUND OF THE INVENTION

Conventional systems fail to leverage user browsing behavior to connect phone calls to entities such as advertisers/vendors that promote goods and/or services. Conventional systems fail to provide the advertisers knowledge about what the user was searching/looking for prior to/or during attending a phone call from a caller. Furthermore, conventional systems fail to provide users knowledge about the advertiser prior to/or during the phone call. What is needed is a system and method that determines phone numbers based on user interests and enhances call experience for users and entities. These and other problems exist.

SUMMARY OF THE INVENTION

Various systems, computer program products, and methods for determining phone numbers based on user interests and enhancing call experience, are described herein.

According to various implementations of the invention, the method may include determining phone numbers based on user interests. The method may include receiving an indication of one or more user actions. The method may include determining an interest of the user based on the one or more user actions. The method may include determining a product or service in which the user is interested based on the determined interest of the user. The method may include selecting a first phone number of a vendor of the product or service and a second phone number of a call center. The method may include providing the second phone number to be communicated, wherein the second phone number when called connects a call to the first phone number.

According to various implementations of the invention, the method may include enhancing call experience. The method may include receiving, from a caller, a phone call via at least one phone number, wherein the at least one phone number is associated a call center. The method may include associating the phone call with a first phone number of a vendor. The method may include providing the caller with first information associated the vendor or providing the vendor with second information associated with the caller. The method may include connecting the caller with the first phone number.

DETAILED DESCRIPTION OF THE INVENTION

Figure 1:
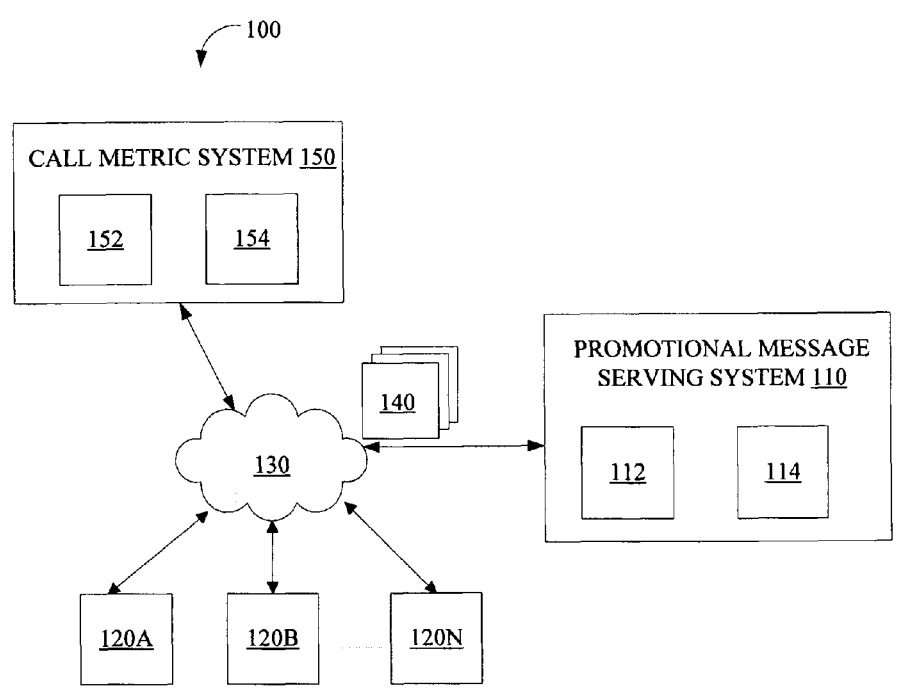
FIG. 1 is a block diagram illustrating a system of determining phone numbers based on user interests and enhancing call experience, according to various implementations of the invention.

FIG. 1 is a block diagram illustrating a system 100 of determining phone numbers based on user interests and enhancing call experience, according to various implementations of the invention. According to various implementations of the invention, system 100 may include, but is not limited to, a promotional message serving system 110, a call metric system 150 and a computing device 120 (illustrated in FIG. 1 as a plurality of computing devices 120A, 120B, 120N). In some implementations of the invention, promotional message serving system 110, call metric system 150 and computing device 120 may be coupled to one another via a network 130. Network 130 may include a Local Area Network, a Wide Area Network, a cellular communications network, a Public Switched Telephone Network, and/or other network or combination of networks.

According to various implementations of the invention, promotional message serving system 110 may include processor 112, memory 114, and/or other components that facilitate the functions of the promotional message serving system 110 described herein. In some implementations, processor 112 includes one or more processors configured to perform various functions of promotional message serving system 110. In some implementations, memory 114 includes one or more tangible (i.e., non-transitory) computer readable media. Memory 114 may include one or more instructions that when executed by processor 112 configure processor 112 to perform the functions of promotional message serving system 110. In some implementations, memory 114 may include one or more instructions stored on tangible computer readable media that when executed at a remote device, such as computing device 120, cause the remote device to display promotional messages, web pages, or other content associated with the entity, as described herein.

According to various implementations of the invention, call metric system 150 may include processor 152, memory 154, and/or other components that facilitate the functions of the call metric system 150 described herein. In some implementations, processor 152 includes one or more processors configured to perform various functions of call metric system 150. In some implementations, memory 154 includes one or more tangible (i.e., non-transitory) computer readable media. Memory 154 may include one or more instructions that when executed by processor 152 configure processor 152 to perform the functions of call metric system 150. In some implementations, memory 154 may include one or more instructions stored on tangible computer readable media that when executed at a remote device, such as computing device 120, cause the remote device to display at least one report, as described herein.

In some implementations, while promotional message serving system 110 and call metric system 150 have been depicted as separate systems in FIG. 1, it will be appreciated that these systems may be included in one or more systems configured to individually or together perform the functions associated with promotional message serving system 110 and call metric system 150 described herein.

According to various implementations of the invention, computing device 120 may include a computing device such as a desktop computer, a laptop computer, a cellular telephone, a personal digital assistant, a tablet computing device, and/or other computing device on which promotional messages, web pages, and/or other content associated with the entity may be displayed.

In some implementations, promotional message serving system 110 may receive an indication of one or more user actions. In some implementations, receiving an indication of one or more user actions may include receiving an indication of a request received by promotional message serving system 110. In some implementations, the request may include a request associated with computing device 120. In some implementations of the invention, the request includes a request for promotional messages, web pages and/or other electronic content to be communicated to computing device 120. In some implementations, the request may be related to an application or other process executing at computing device 120. In some implementations, the request includes one or more search terms (i.e., keywords) from an operator/user of computing device 120 entered into a search engine. In other words, the request may include a search request from the user. The search engine may be a web-based search engine and/or a search engine that searches a hard drive or other component of computing device 120. In some implementations, the request may be related to an application such as a gaming or other application being displayed at computing device 120. For example, the request may include a login to an online gaming application accessed using computing device 120. In some implementations, the request may include location information that indicates a geographic location of computing device 120 (for example, in case the computing device is a portable computing device). Other types of requests related to applications and/or processes executing at computing device 120 may be received by promotional message serving system 110 as would be appreciated.

In some implementations of the invention, the request may include one or more request keywords entered by a user of computing device 120. The request keywords may include one or more letters, numbers, characters, symbols, words, and/or any combination of the foregoing. In some implementations, based on the request (i.e., the request keywords), promotional message serving system 110 may generate one or more responses 140 to be communicated to and displayed at computing device 120. In some implementations, a response may include a promotional message associated with an entity, a web page associated with an entity, a landing page associated with an entity, and/or other responses. In some implementations, generating a response 140 may include identifying a promotional message associated with an entity to be communicated to computing device 120 based on the one or more request keywords. In some implementations, the entity may include an advertiser, retailer, vendor, and/or any other entity that is associated with the response. For example, promotional message serving system 110 may generate one or more responses related to: request keywords entered by the operator of computing device 120 (such as florist advertisements when the user searches for "online flowers"); a gaming application being played by the operator of computing device 120 (such as a response related to other gaming applications or upgrades to the gaming application being played); the location of computing device 120 (such as advertisements from retailers within walking distance of computing device 120, i.e., in case the computing device is a portable computing device); and/or other responses related to the request from computing device 120.

In some implementations, the promotional messages may include, but is not limited to, one or more advertisements, one or more coupons, and/or other promotional/marketing content. In some implementations, promotional messages may include various types of formats such as text, image, video, audio, other formats suitable to convey promotional messages, and/or any combination of formats. In some implementations, the promotional messages may be provided by entities (e.g., advertisers, vendors, etc.) wishing to promote their goods or services.

In some implementations, the entity may include an advertiser, retailer, vendor, and/or any other entity associated with the promotional message/response. For example, an entity may include an advertiser that wishes to communicate a promotional message such as an advertisement to a user. In this example, promotional message serving system 110 may receive the advertisement to be communicated to a user on behalf of the advertiser at an appropriate time (such as, without limitation, alongside search engine results, within a webpage, or within a graphical user interface).

In some implementations, receiving an indication of one or more user actions may include receiving an indication that the user viewed a promotional message associated with an entity (e.g., advertiser, vendor, etc.). In some implementations, receiving an indication of one or more user actions may include receiving an indication that the user selected a promotional message associated with the entity.

In some implementations, receiving an indication of one or more user actions may include receiving an indication that the user viewed a website associated with the entity. In some implementations, receiving an indication of one or more user actions may include receiving an indication that the user viewed a product or service associated with the website. For example, a promotional message (for example, an advertisement) may be displayed to user of computing device 120. The advertisement may be associated with the entity and/or a product or service of the entity. In some implementations, the user may click on or otherwise select the advertisement which may cause a website associated with the entity to be displayed. The website may have any number of web pages and landing pages associated with it. In some implementations, the website/web pages may be associated with the product or service of the entity.

In some implementations, promotional message serving system 110 may determine an interest of the user based on the one or more user actions. For example, user interests may be based on search terms (i.e., request keywords) entered by the user using computing device 120, the promotional message viewed and/or selected by the user, the website/web page visited/viewed by the user, user download activity (such as games, music, movies, etc.), user application activity (such as game play, using software, hardware, etc.) and/or other indications of user actions as described herein. In some implementations, promotional message serving system 110 may track the user actions. For example, promotional message serving system 110 may track the request keywords entered by the user, a date/time indicating when the request keywords were entered by the user, and/or other parameters associated with the request keywords. In some implementations, promotional message serving system 110 may track the promotional message presented/communicated to, viewed, and/or selected by the user, the date/time indicating when the promotional message was presented, viewed, and/or selected by the user, and/or other parameters associated with the promotional message. In some implementations, promotional message serving system 110 may track the website/web page associated with the entity, the date/time indicating when the website/web page was visited by and/or viewed by the user, the date/time indicating when a product or service associated with the website was viewed by the user, and/or other parameters associated with the website/web page.

In some implementations, promotional message serving system 110 may determine a product or service in which the user may be interested based on the determined interest of the user. For example, a user may search for shoes by entering keywords in a search engine. This may indicate a user's interest in shoes. Thus, a determination may be made that the user is interested in shoes. In some implementations, a user may select a promotional message associated with a particular brand of shoes or a particular vendor offering/providing a particular brand of shoes. This may indicate a user's interest in a particular brand and/or a particular vendor. Thus, a determination may be made that the user is interested in a particular brand of shoes and/or a particular vendor offering the brand. The selection of the promotional message may cause a website associated with the vendor to be displayed. The user may view web pages associated with the particular brand of shoes. This again may indicate a user's interest in the particular brand of shoes offered by the vendor. Thus, a determination may be made that the user is interested in a particular brand of shoes offered by the vendor associated with the website.

As used herein, "selecting" or "selection of" a promotional message includes, but is not limited to, clicking with a finger, a stylus, or other object; shaking or tapping computing device 120 (in the case where the computing device is portable, for example); uttering a verbal command; and/or taking any other action in relation to computing device 120 to indicate a selection of a promotional message.

In some implementations, one or more first phone numbers may be associated with an entity (e.g., advertiser, vendor, etc.). For example, a vendor may have one or more departments offering one or more products or services. In some implementations, the one or more first phone numbers may include phone numbers associated with the departments of the vendor. In some implementations, a vendor may have one or more associated physical locations (for example, retail locations). In some implementations, the one or more first phone numbers may include phone numbers associated with the physical locations of the vendor. In some implementations, the one or more first numbers may include phone numbers associated with one or more web pages of the vendor's website (for example, the one or more web pages may be associated with a particular department and/or product or service offered by the vendor). In some implementations, the vendor may provide a list of the first phone numbers to promotional message serving system 110 and/or call metric system 150. In some implementations, the list may be stored in memory 114 of promotional message serving system 110 and/or memory 154 of call metric system 150. In some implementations, the one or more first phone numbers may be extracted from the website/web pages associated with the vendor.

In some implementations, one or more second phone numbers may be associated with a call center (for example, call metric system 150). In some implementations, the one or more second phone numbers may be mapped to the entity's first phone numbers. In some implementations, one second phone number may be mapped to one or more first phone numbers. In these implementations, a second phone number may include a phone number that when called connects a call via the call center to at least one first phone number. In some implementations, the mapping between the first and second phone numbers may be stored in memory 114 of promotional message serving system 110 and/or memory 154 of call metric system 150.

In some implementations, the one or more second phone numbers may be associated with one or more keywords. In some implementations, the one or more keywords may include keyword(s) that the entity (e.g., advertiser, vendor, etc.) wishes to target such that at least one promotional message associated with the entity may be displayed in response to the keyword(s). For example, an advertiser or other entity may wish to target the keyword "shoes", such that whenever a user searches for shoes (for example, using a search engine), an advertisement for shoes associated with the advertiser is displayed to the user. In some implementations, promotional message serving system 110 and/or call metric system 150 may include a list of the one or more keywords and the phone number(s) associated with each keyword. In some implementations, the list may be stored in memory 114 and/or 154, for example. In some implementations, the keywords from the list may be received from the advertiser.

In some implementations, the one or more second numbers may be associated with one or more promotional messages. In some implementations, the one or more second phone numbers may be associated with the entity with which the promotional message(s) is associated. In some implementations, the one or more second numbers may be associated with one or more websites/web pages associated with entity. In some implementations, promotional message serving system 110 and/or call metric system 150 may receive the associations from the entity. In some implementations, the associations may be stored in memory 114 and/or 154, for example.

In some implementations, promotional message serving system 110 may select a first phone number of a vendor of a product or service in which the user may be interested. For example, a determination may be made that a user is interested in a product or service associated with the vendor. In response to the determination, promotional message serving system 110 may select at least one first phone number of the one or more first phone numbers (from the list of first phone numbers, for example). In some implementations, promotional message serving system 110 may select the first phone number associated with a particular department of the vendor that offers the product or service that the user is interested in. In some implementations, promotional message serving system 110 may select the first phone number associated a particular physical location of the vendor that offers the product or service that the user is interested in.

In some implementations, promotional message serving system 110 may select a second phone number associated with a call center. In some implementations, promotional message serving system 110 may select at least one second number of the one or more second phone numbers. In some implementations, promotional message serving system 110 may select the second phone number that is mapped to the selected first phone number. In some implementations, the selected second phone number when called connects a call to the selected first phone number.

In some implementations, promotional message serving system 110 may provide the selected second phone number to be communicated. In some implementations, the selected second phone number may be communicated to computing device 120. In some implementations of the invention, promotional message serving system 110 may generate a response 140 to the request (for example, search request), wherein the response may comprise the selected second phone number. In some implementations, promotional message serving system 110 may communicate the response to be displayed at computing device 120. In some implementations of the invention, promotional message serving system 110 may communicate the response to a third party that subsequently communicates the response to computing device 120. In some implementations of the invention, promotional message serving system 110 may communicate the response directly to computing device 120.

In some implementations, the response may include a promotional message associated with an entity, a web page associated with an entity, a landing page associated with an entity, and/or other responses. In some implementations, the selected second phone number may be included in any type of response. For example, a promotional message (for example, an advertisement) may be displayed to user of computing device 120. The user may click on or otherwise select the advertisement which may cause a website associated with the entity to be displayed. The website may have any number of web pages and landing pages associated with it. As such, the selected second phone number may be included in the promotional message or any of the web pages and landing pages associated with the website.

In some implementations, the entity may incorporate one or more instructions such as java script code in the website such that when a user selection causes the website to be displayed, the selected second phone number may be displayed on the website. In other words, when the website is visited, the code is executed and causes the selected second phone number to be inserted in the web page/landing page. As such, when the web page/landing page is displayed at computing device 120, the selected second phone number is also displayed. It will be understood that any other scripting language may be used as long as the code causes the phone number to be inserted/displayed.

In some implementations, computing device 120 may include a mobile communication device and the selected second phone number may be provided to the mobile communication device (for example, included in a promotional message and/or other electronic content displayed at the mobile communication device). In some implementations, promotional message serving system 110 may determine a location of the mobile communication device. In some implementations, promotional message serving system 110 may determine a distance between the mobile communication device and one or more physical locations associated with the entity/vendor based on the determined location of the mobile communication device. In some implementations, promotional message serving system 110 may select the first phone number based on the one or more user actions and the determined distance. In some implementations, the first phone number may include a phone number of at least one physical location of the one or more physical locations associated with the entity. In some implementations, the first phone number may include a phone number of at least one physical location that has a shortest distance to the mobile communication device.

In some implementations, promotional message serving system 110 may determine an inventory of the product or service of the vendor. In some implementations, promotional message serving system 110 may receive inventory information associated with the product or service from the entity. In some implementations, the selection of the first phone number may be based at least in part on the determined inventory. In some implementations, promotional message serving system 110 may determine whether the product or service that the user is interested in is available based on the determined inventory. In response to a determination that the product or service is available, promotional message serving system 110 may select the first phone number of the department and/or physical location that offers the product or service. In response to a determination that the product or service is not available, promotional message serving system 110 may select a default phone number of the entity (for example, generic entity hotline) instead of the first phone number, such that the selected second phone number when called connects a call to the default phone number.

In some implementations, call metric system 150 may receive, from a caller/user, at least one phone call associated with a second phone number. In some implementations, call metric system 150 may receive at least one phone call associated with a promotional message and/or response. In some implementations, upon receiving the response, a user may call the second phone number included in the response. For example, call metric system 150 may receive a phone call from a user that called a second phone number that is displayed on an advertisement, landing page, or other content associated with the advertisement. In some implementations, the phone call is made using computing device 120. In other implementations, the phone call is made using another device having a telephone function. In some implementations, call metric system 150 may track the at least one phone call. In some implementations, tracking may include monitoring the duration of the call, determining an area code of the caller associated with the call, recording a date/time of the call, recording the call, transcribing the call (for the entity, for example), and/or performing other functions that facilitate an analysis of the calls.

In some implementations, call metric system 150 may associate the at least one phone call with a first phone number of an entity (for example, a vendor). In some implementations, call metric system 150 may associate the phone call with the first phone number based on the mapping between the first and second phone numbers (stored in memory 154, for example). In some implementations, call metric system 150 may communicate with promotional message serving system 110 to associate the phone call with the first phone number (based on the mapping stored in memory 114, for example).

In some implementations, call metric system 150 may track the received at least one phone call by determining that the call resulted from a promotional message. For example, call metric system 150 may determine that a call originated from a promotional message such as an advertisement, thereby attributing the call to the promotional message. Accordingly, when a user calls the second phone number, call metric system 150 may determine that the phone call originated from the promotional message based on the association between the second phone number and the promotional message. In some implementations, the phone call may be tracked by correlating when the promotional message was communicated and when a phone call associated with the second phone number was received. As would be appreciated, for example, based on the date/time that the promotional message was communicated and the date/time that the phone call was received, various statistical analyses may be performed to determine that the phone call is correlated with (i.e., resulted from) the promotional message (in other words, that the promotional message led to the phone call).

In some implementations, call metric system 150 may track the received at least one phone call by determining that the call resulted from a keyword associated with the entity, such that a promotional message associated with the entity may be displayed in response the keyword. Accordingly, when a user calls the second phone number, call metric system 150 may determine that the phone call originated from the keyword based on the association between the second phone number and the keyword. In some implementations, the phone call may be tracked by correlating when the keyword was entered, when the promotional message was communicated and when a phone call associated with the second phone number was received. As would be appreciated, for example, based on the date/time that the tracked keyword was entered, the date/time that the promotional message was communicated and the date/time that the phone call was received, various statistical analyses may be performed to determine that the phone call is correlated with (i.e., resulted from) the keyword and/or promotional message (in other words, that the keyword and/or promotional message led to the phone call).

In some implementations, call metric system 150 may track the received at least one phone call by determining that the call resulted from a website/web page associated with the entity. Accordingly, when a user calls the second phone number, call metric system 150 may determine that the phone call originated from the website/web page based on the association between the second phone number and the website/web page. In some implementations, the phone call may be tracked by correlating when the website/web page was visited and when a phone call associated with the second phone number was received. As would be appreciated, for example, based on the date/time that the website/web page was visited and the date/time that the phone call was received, various statistical analyses may be performed to determine that the phone call is correlated with (i.e., resulted from) the website/web page (in other words, that the website/web page led to the phone call).

In some implementations, call metric system 150 may establish a call between the caller and the first phone number based on the received at least one phone call. In some implementations, establishing a call may include connecting the at least one phone call to the first phone number associated with the entity, forwarding the at least one phone call to the first phone number, dialing the first phone number and bridging the at least one phone call, etc.

In some implementations, call metric system 150 may provide the caller with first information associated with the entity. In some implementations, call metric system 150 may provide the caller with first information prior to establishing the call between the caller and the first phone number. In some implementations, call metric system 150 may provide the caller with first information during the established call between the caller and the first phone number. For example, the first information may be provided to the caller while the caller is waiting on IVR (interactive voice response) for a human customer service person associated with the entity.

In some implementations, call metric system 150 may determine the first information to be provided to the caller based on at least the second phone number associated with the received at least one phone call. In some implementations, the first information may include information associated with a product or service of the entity. In some implementations, the first information may include information associated with the product or service in which the caller has indicated an interest prior to calling the second phone number.

In some implementations, call metric system 150 may determine that the phone call resulted from at least one keyword, at least one promotional message, and/or at least one website/web page associated with the entity based on their association with the second phone number. As described above, the at least one keyword, at least one promotional message, and/or at least one website/web page associated with the entity, and the various user/caller actions performed may provide an indication of the caller's interest in the product or service associated with the entity. Call metric system 150 may determine the first information to be provided based on the second phone number and its associations, and/or the user/caller actions performed prior to calling the second phone number.

In some implementations, call metric system 150 may provide the entity with second information associated with the caller. In some implementations, call metric system 150 may provide the entity with second information prior to establishing the call between the caller and the first phone number. In some implementations, call metric system 150 may provide the entity with second information during the established call between the caller and the first phone number.

In some implementations, the second information may indicate one or more user actions that occurred prior to receiving the at least one phone call. In some implementations, the one or more user actions may indicate an interest in a product or service of the vendor. For example, the caller may have performed one or more of the following user actions prior to calling the second phone number: entered a search request, viewed a promotional message associated with the entity, selected a promotional message associated with the entity, viewed a website associated with the entity, viewed a product or service associated with the website, downloaded certain content, executed certain software or hardware, and/or other user actions that indicate user interests. In this manner, the entity may be informed of user interests prior to, during, or after taking the call. The one or more user actions may be tracked by promotional message serving system 110, as described above.

In some implementations, call metric system 150 may determine the second information to be provided to the entity based on at least the second phone number associated with the received at least one phone call. In other words, call metric system 150 may determine the one or more user actions that occurred prior to the received at least one phone call based at least on the second phone number. In some implementations, call metric system 150 may determine that the phone call resulted from at least one keyword, at least one promotional message, and/or at least one website/web page associated with the entity based on their association with the second phone number. As such, various user actions performed (prior to calling the second phone number) with respect to the at least one keyword, at least one promotional message, and/or at least one website/web page associated with the entity may be determined (based on, for example, the tracked information associated with the user actions).

By providing first information to the caller and/or second information to the entity, the call experience for the caller and/or the entity may be enhanced. For example, while the caller is waiting for a customer service representative associated with the entity, information regarding the product or service in which the user is interested may be provided to the user. In other words, the user is provided with information that user desires or has an interest in. On the other hand, by providing the entity with information regarding what the user has been searching/looking for (i.e., user actions) prior to establishing the call or during the established call, for example, the entity may cater to the call in an informed manner. For example, a customer service representative handling the call may be able to ask the caller questions regarding the product or service in which the user is interested.

In some implementations, call metric system 150 may generate at least one report. In some implementations, the report may include, among other things, monitored, recorded, and/or transcribed information associated with the calls. In some implementations, the report may include other conventional metrics associated with the calls as would be appreciated.

In some implementations, call metric system 150 may receive a request for the report from an advertiser or other entity. In response to the request, call metric system 150 may generate the report and communicate the report to a remote computing device used by an advertiser (not otherwise illustrated in FIG. 1).

Figure 2:
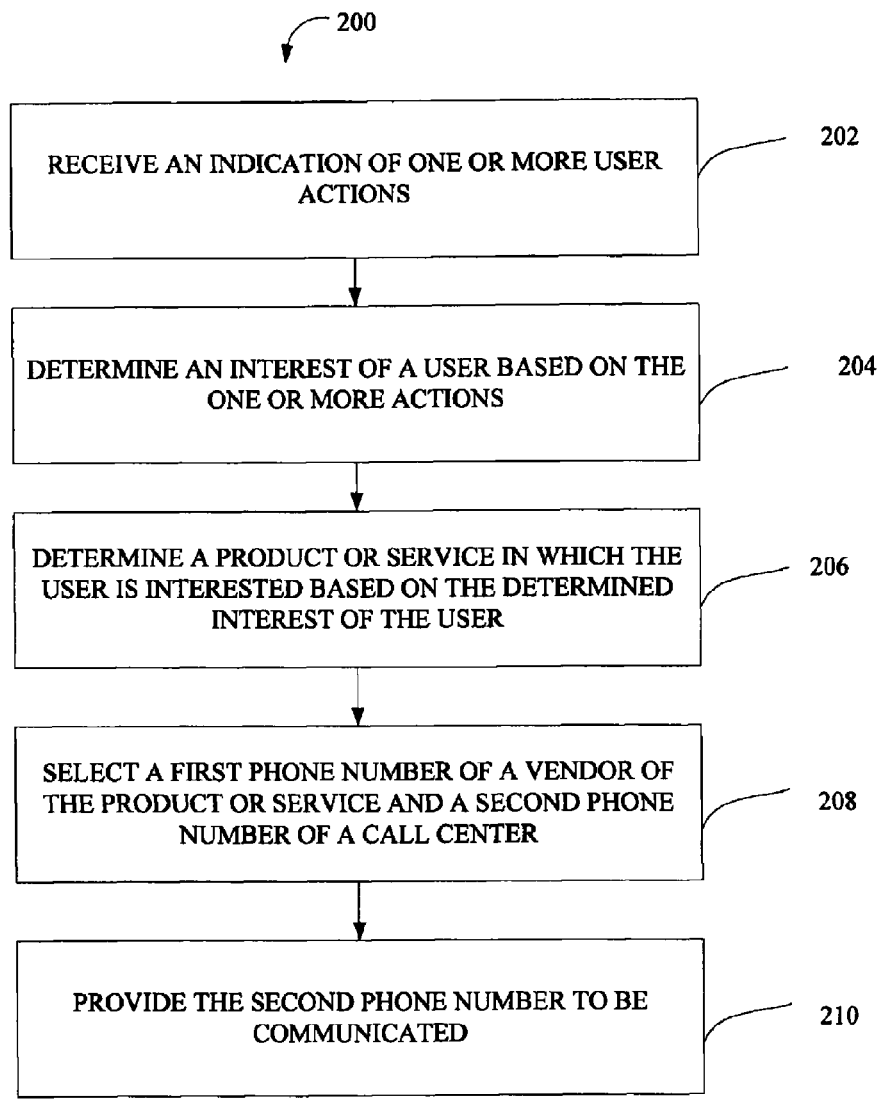
FIG. 2 is a flow diagram illustrating an example process of determining phone numbers based on user interests, according to various implementations of the invention.

FIG. 2 is a flow diagram illustrating an example process 200 of determining phone numbers based on user interests, according to various implementations of the invention. The various processing operations and/or data flows depicted in FIG. 2 (and in the other drawing figures) are described in greater detail herein. The described operations for a flow diagram may be accomplished using some or all of the system components described in detail above and, in some implementations of the invention, various operations may be performed in different sequences. According to various implementations of the invention, additional operations may be performed along with some or all of the operations shown in the depicted flow diagrams. In yet other implementations, one or more operations may be performed simultaneously. Accordingly, the operations as illustrated (and described in greater detail below) are examples by nature and, as such, should not be viewed as limiting.

In some implementations of the invention, process 200 may receive an indication of one or more user actions in an operation 202. In an operation 204, process 200 may determine an interest of a user based on the one or more user actions. In an operation 206, process 200 may determine a product or service in which the user is interested based on the determined interest of the user. In an operation 208, process 200 may select a first phone number of a vendor of the determined product or service and a second phone number of a call center. In an operation 210, process 200 may provide the second phone number to be communicated (to computing device 120, for example). In some implementations, the second phone number when called connects a call to the first phone number.

Figure 3:
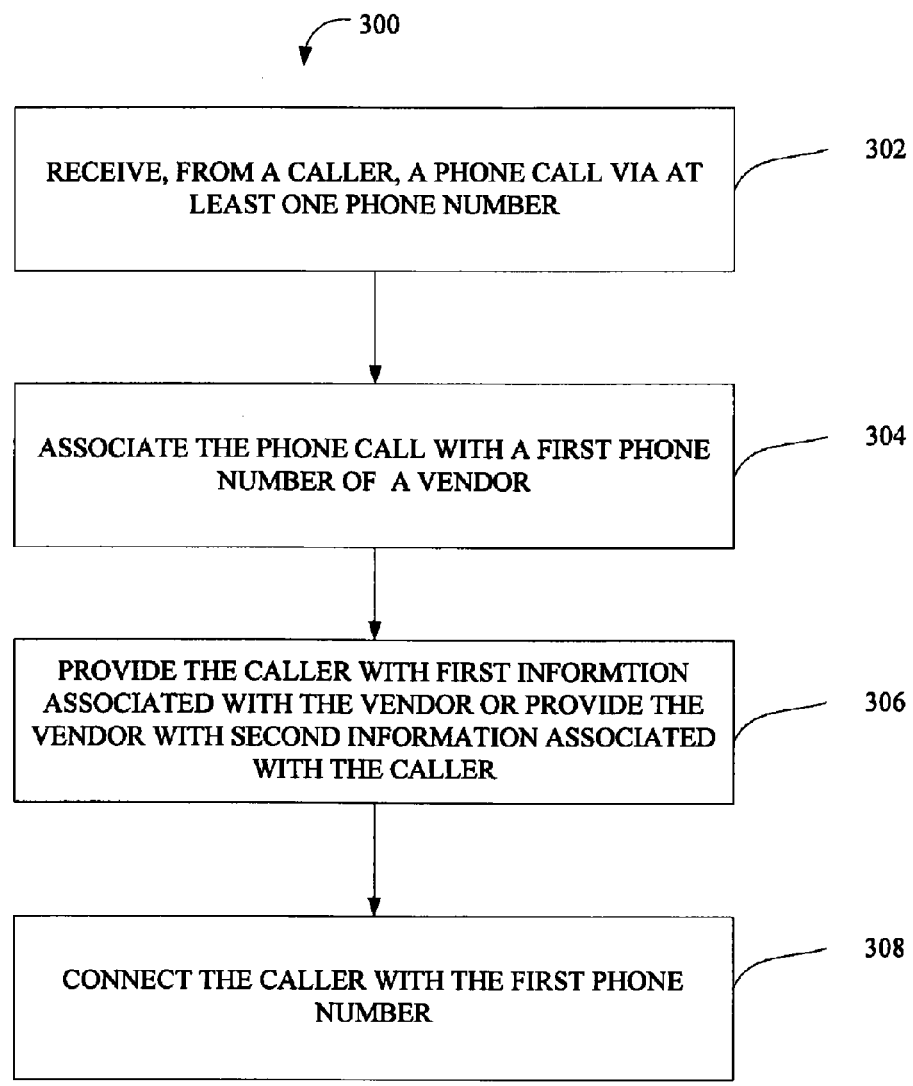
FIG. 3 is a flow diagram illustrating an example process of enhancing call experience, according to various implementations of the invention.

FIG. 3 is a flow diagram illustrating an example process 300 of enhancing call experience, according to various implementations of the invention. In an operation 302, process 300 may receive, from a caller, a phone call via at least one phone number. In some implementations, the at least one phone number is associated with a call center. In an operation 304, process 300 may associate the phone call with a first phone number of a vendor. In an operation 306, process 300 may provide the caller with first information associated with the vendor or may provide the vendor with second information associated with the caller. In an operation 308, process 300 may connect the caller with the first phone number.

Figure 4:
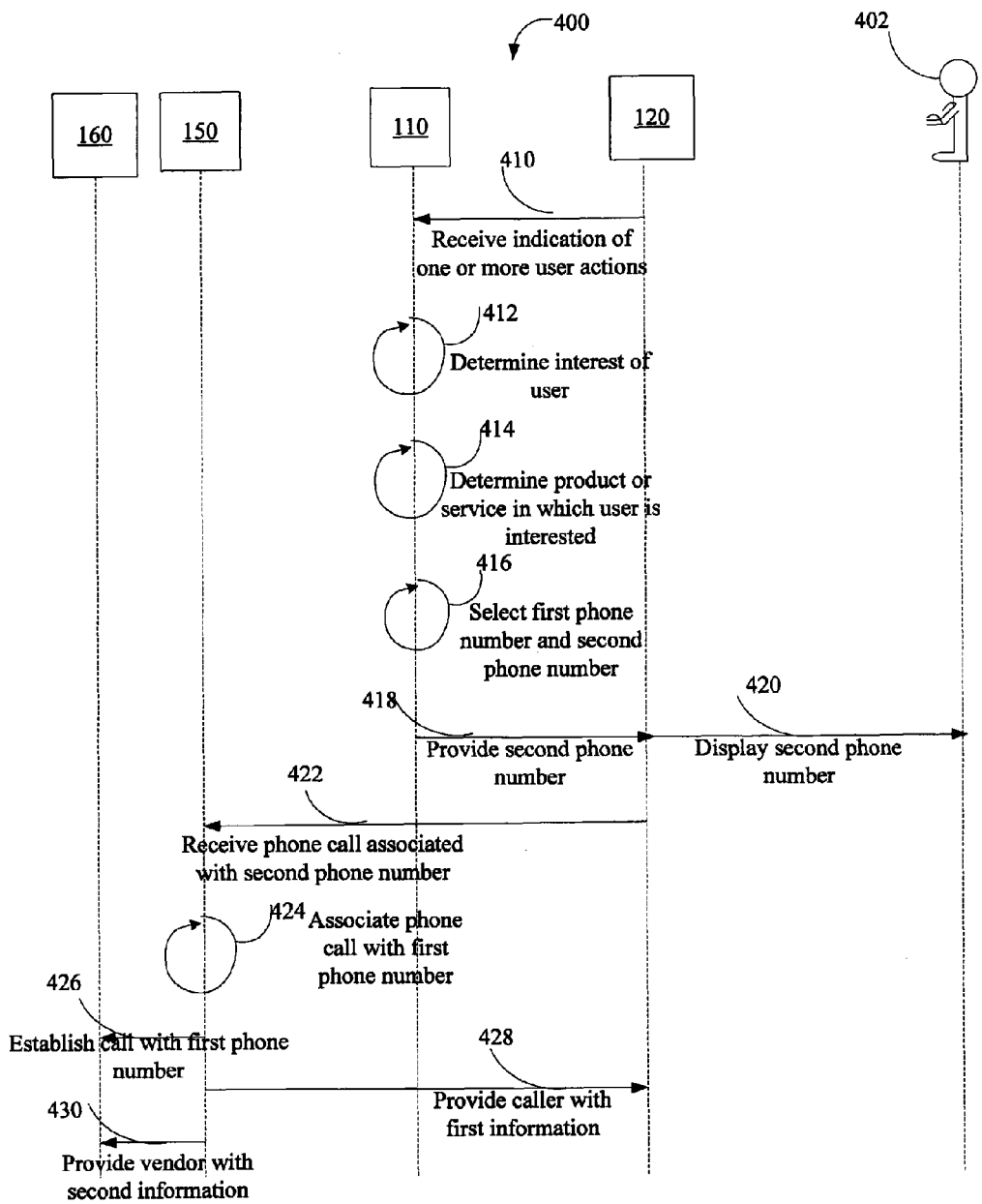
FIG. 4 is a data flow diagram illustrating process relationships in a system of determining phone numbers based on user interests and enhancing call experience, according to various implementations of the invention.

FIG. 4 is a data flow diagram 400 illustrating example process relationships in a system of determining phone numbers based on user interests and enhancing call experience, according to various implementations of the invention.

According to various implementations of the invention, in an operation 410, promotional message serving system 110 may receive an indication of one or more user actions. In some implementations, receiving an indication of one or more user actions may include receiving an indication of a search request from user 402. In some implementations, the results of the search request may be associated with a product or service in which user 402 is interested. In some implementations, receiving an indication of one or more user actions may include receiving an indication that user 402 viewed a promotional message associated with an entity 160 (e.g., advertiser, vendor, etc.). In some implementations, receiving an indication of one or more user actions may include receiving an indication that user 402 selected a promotional message associated with entity 160. In some implementations, receiving an indication of one or more user actions may include receiving an indication that user 402 viewed a website associated with entity 160. In some implementations, receiving an indication of one or more user actions may include receiving an indication that user 402 viewed a product or service associated with the website.

In an operation 412, promotional message serving system 110 may determine an interest of user 402 based on the one or more user actions. In an operation 414, promotional message serving system 110 may determine a product or service that user 402 is interested in based on the determined interest of user 402.

In an operation 416, promotional message serving system 110 may select a first phone number of entity 160 of the determined product or service. In some implementations, promotional message serving system 110 may select a second phone number of a call center (for example, call metric system 150). In some implementations, promotional message serving system 110 may select the second phone number that is mapped to the selected first phone number.

In an operation 418, promotional message serving system 110 may provide the second phone number to be communicated (to computing device 120, for example). In some implementations, promotional message serving system 110 may generate a response to a request (for example, search request) wherein the response may comprise the second phone number Promotional message serving system 110 may communicate the generated response to be displayed at computing device 120, in an operation 420. The response may be viewed by user 402 of computing device 120.

In an operation 422, call metric system 150 may receive a phone call via a second phone number, wherein the second phone number is associated with the call center. Call metric system 120 may receive the phone call from user 402 of computing device 120. In an operation 424, call metric system 150 may associate the received phone call with the first phone number of entity 160. In some implementations, call metric system 150 may associate the phone call with the first phone number based on the mapping between the first and second phone number.

In an operation 426, call metric system 150 may establish a call between user 402 and the first phone number based on the received at least one phone call. In some implementations, establishing a call may include connecting the received phone call to the first phone number associated with the entity, forwarding the received phone call to the first phone number, dialing the first phone number and bridging the received phone call, etc In an operation 428, call metric system 150 may provide the user 402 with first information associated with entity 160. In some implementations, the first information may include information associated with a product or service of entity 160. In some implementations, the first information may include information associated with the product or service that the caller/user 402 has indicated an interest in prior to calling the second phone number. In some implementations, the first information may be communicated to computing device 120

In an operation 430, call metric system 150 may provide entity 160 with second information associated with user 402. In some implementations, the second information may indicate one or more user actions that occurred prior to receiving the phone call from user 402. In some implementations, the one or more user actions may indicate an interest in a product or service of the vendor. In some implementations, the second information may be communicated to a computing device (not otherwise illustrated) associated with entity 160.

Implementations of the invention may be made in hardware, firmware, software, or any suitable combination thereof. Implementations of the invention may also be implemented as instructions stored on a machine readable medium, which may be read and executed by one or more processors. A tangible machine-readable medium may include any tangible, non-transitory, mechanism for storing or transmitting information in a form readable by a machine (e.g., a computing device). For example, a tangible machine-readable storage medium may include read only memory, random access memory, magnetic disk storage media, optical storage media, flash memory devices, and other tangible storage media. Intangible machine-readable transmission media may include intangible forms of propagated signals, such as carrier waves, infrared signals, digital signals, and other intangible transmission media. Further, firmware, software, routines, or instructions may be described in the above disclosure in terms of specific exemplary implementations of the invention, and performing certain actions. However, it will be apparent that such descriptions are merely for convenience and that such actions in fact result from computing devices, processors, controllers, or other devices executing the firmware, software, routines, or instructions.

Implementations of the invention may be described as including a particular feature, structure, or characteristic, but every aspect or implementation may not necessarily include the particular feature, structure, or characteristic. Further, when a particular feature, structure, or characteristic is described in connection with an aspect or implementation, it will be understood that such feature, structure, or characteristic may be included in connection with other implementations, whether or not explicitly described. Thus, various changes and modifications may be made to the provided description without departing from the scope or spirit of the invention. As such, the specification and drawings should be regarded as exemplary only, and the scope of the invention to be determined solely by the appended claims.

What is claimed is:

1. A computer-implemented method comprising:
   receiving an indication of one or more user actions associated with a mobile communication device of a user;
   determining an interest of the user based on the one or more user actions;
   determining a product or service in which the user is interested based on the determined interest of the user;
   selecting a first phone number of a vendor of the product or service and a second phone number of a call center; and
   communicating the second phone number for display on the mobile communication device of the user, wherein the second phone number when called connects the mobile communication device to the first phone number.

2. The computer-implemented method of claim 1, wherein the first phone number is associated with a department of the vendor that offers the product or service.

3. The computer-implemented method of claim 1, wherein receiving an indication of one or more user actions comprises receiving an indication of a search request from the user of the mobile communication device, wherein results of the search request is are associated with the determined product or service.

4. The computer-implemented method of claim 1, wherein receiving an indication of one or more user actions comprises one or more of: receiving an indication that the user viewed a promotional message associated with the vendor on a display of the mobile communication device or receiving an indication that the user selected a promotional message associated with the vendor on the display of the mobile communication device.

5. The computer-implemented method of claim 1, wherein receiving an indication of one or more user actions comprises one or more of: receiving an indication that the user viewed a website associated with the vendor on a display of the mobile communication device, or receiving an indication that the user viewed a product or service associated with the website on the display of the mobile communication device.

6. The computer-implemented method of claim 1, further comprising:
   receiving, from a caller, at least one call associated with the second phone number; and
   establishing a call between the caller and the first phone number based on the at least one call.

7. The computer-implemented method of claim 1, further comprising:
   determining a location of the mobile communication device;
   determining a distance between the location of the mobile communication device and one or more physical locations associated with the vendor; and
   wherein said selecting the first phone number further comprises selecting the first phone number based on the one or more user actions and the distance, wherein the first phone number comprises a phone number of at least one physical location of the one or more physical locations.

8. The computer-implemented method of claim 1, further comprising determining an inventory of the product or service of the vendor, wherein selecting the first phone number is based on the determined inventory.

9. A computer-implemented method comprising:
   receiving, from a caller using a mobile communication device, a phone call via at least one phone number, wherein the at least one phone number is associated with a call center;
   associating the phone call with a first phone number of a vendor;
   providing the caller with first information associated with the vendor or providing the vendor with second information associated with the caller; and
   connecting the caller with the first phone number.

10. The computer-implemented method of claim 9, further comprising:
    determining one or more user actions associated with the mobile communication device that occurred prior to the phone call; and
    providing the vendor with the second information that indicates the one or more user actions.

11. The computer-implemented method of claim 9, further comprising
    providing the caller with the first information, wherein the first information comprises information associated with the product or service of the vendor.

12. The computer-implemented method of claim 10, wherein the one or more user actions indicate an interest in the product or service of the vendor by the caller.

13. A computer-implemented system comprising one or more processors configured to:
    receive an indication of one or more user actions by a user of a mobile communication device;
    determine an interest of the user based on the one or more user actions;
    determine a product or service in which the user is interested based on the determined interest of the user;

select a first phone number of a vendor of the product or service and a second phone number of a call center; and communicate the second phone number for display on the mobile communication device of the user, wherein the second phone number when called connects the mobile communication device to the first phone number.

14. The computer-implemented system of claim 13, wherein the first phone number is associated with a department of the vendor that offers the product or service.

15. The computer-implemented system of claim 13, wherein receiving an indication of one or more user actions comprises receiving an indication of a search request from the user of the mobile communication device, wherein results of the search request is are associated with the determined product or service.

16. The computer-implemented system of claim 13, wherein receiving an indication of one or more user actions comprises one or more of: receiving an indication that the user viewed a promotional message associated with the vendor on a display of the mobile communication device or receiving an indication that the user of the mobile communication device selected a promotional message associated with the vendor.

17. The computer-implemented system of claim 13, wherein receiving an indication of one or more user actions comprises one or more of: receiving an indication that the user viewed a website associated with the vendor on a display of the mobile communication device, or receiving an indication that the user viewed a product or service associated with the website on the display of the mobile communication device.

18. The computer-implemented system of claim 13, wherein the one or more processors are further configured to:

receive, from a caller using the mobile communication device, at least one call associated with the second phone number; and establish a call between the mobile communication device caller and the first phone number based on the at least one call.

19. The computer-implemented system of claim 13, wherein the second phone number is provided to the mobile communication device, and wherein the one or more processors are further configured to:

determine a location of the mobile communication device;

determine a distance between the mobile communication device and one or more physical locations associated with the vendor based on the determined location; and wherein the one or more processors configured to select the first phone number further comprise one or more processors configured to:

select the first phone number based on the one or more user actions and the distance, wherein the first phone number comprises a phone number of the one or more physical locations.

20. The computer-implemented system of claim 13, wherein the one or more processors are further configured to determine an inventory of the product or service of the vendor, wherein selecting the first phone number is based on the determined inventory.

\* \* \* \* \*

UNITED STATES PATENT AND TRADEMARK OFFICE
CERTIFICATE OF CORRECTION

PATENT NO. : 8,732,009 B1
APPLICATION NO. : 13/216695
DATED : May 20, 2014
INVENTOR(S) : Jian Zhou, Anshul Kothari and Surojit Chatterjee It is certified that error appears in the above-identified patent and that said Letters Patent is hereby corrected as shown below:

In the Claims:

In Claim 3, column 13, line 61, delete "is are" and insert --are--;

In Claim 15, column 15, line 13, delete "is are" and insert --are--; and

In Claim 18, column 16, line 7, before "and" delete "caller".

Signed and Sealed this
Ninth Day of September, 2014

Michelle K. Lee
*Deputy Director of the United States Patent and Trademark Office*